(12) United States Patent
Chiang

(10) Patent No.: US 11,281,315 B2
(45) Date of Patent: Mar. 22, 2022

(54) DISPLAY SCREEN WITH INTEGRATED POST

(71) Applicant: GM Global Technology Operations LLC, Detroit, MI (US)

(72) Inventor: Richard Chiang, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/248,913

(22) Filed: Jan. 16, 2019

(65) Prior Publication Data
US 2020/0225780 A1    Jul. 16, 2020

(51) Int. Cl.
| G06F 3/02 | (2006.01) |
| G06F 3/041 | (2006.01) |
| G06F 3/0362 | (2013.01) |
| B60K 35/00 | (2006.01) |
| B29C 45/00 | (2006.01) |
| B29C 45/14 | (2006.01) |
| B29L 31/34 | (2006.01) |

(52) U.S. Cl.
CPC .......... *G06F 3/041* (2013.01); *B29C 45/0001* (2013.01); *B29C 45/14467* (2013.01); *B60K 35/00* (2013.01); *G06F 3/02* (2013.01); *G06F 3/0362* (2013.01); B29K 2995/0026 (2013.01); B29L 2031/3475 (2013.01); B60K 2370/126 (2019.05); B60K 2370/143 (2019.05); B60K 2370/1438 (2019.05); B60K 2370/774 (2019.05)

(58) Field of Classification Search
CPC .......... G02B 5/30; G06F 3/0362; B60K 37/06
See application file for complete search history.

(56) References Cited

U.S. PATENT DOCUMENTS

| 2009/0122403 | A1* | 5/2009 | Lu | ....................... G02B 5/3083 359/489.02 |
| 2012/0287663 | A1 | 11/2012 | Lathrop et al. | |
| 2017/0052399 | A1* | 2/2017 | Guzman | ............... G06F 3/0362 |
| 2018/0373350 | A1* | 12/2018 | Rao | .......................... G06F 3/038 |

OTHER PUBLICATIONS

Evonik: Acrylic plastics for LED headlights, K-AKTUELL, Nov. 13, 2014, accessed from Internet: <https://www.k-aktuell.de/technologie/evonik-acrylkunststoffe-fuer-led-scheinwerfer-15448/>.

* cited by examiner

*Primary Examiner* — Michael A Faragalla
(74) *Attorney, Agent, or Firm* — Vivacqua Crane PLLC

(57) ABSTRACT

A display screen is disclosed and includes a display screen body having a viewing surface, a rear surface, and an aperture extending between the viewing surface and the rear surface. The display screen also includes a post constructed of a substantially transparent material without birefringence. The post is located within the aperture of the display screen body. A portion of the post extends out of the aperture in a direction away from the viewing surface of the display screen body to create a projection.

12 Claims, 3 Drawing Sheets

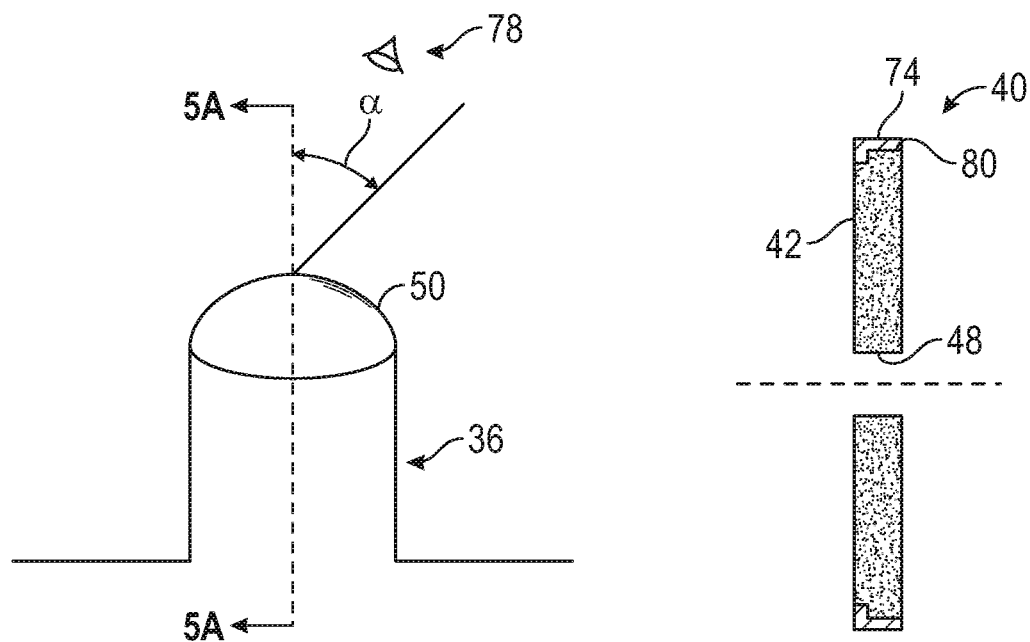
FIG. 4
FIG. 5A
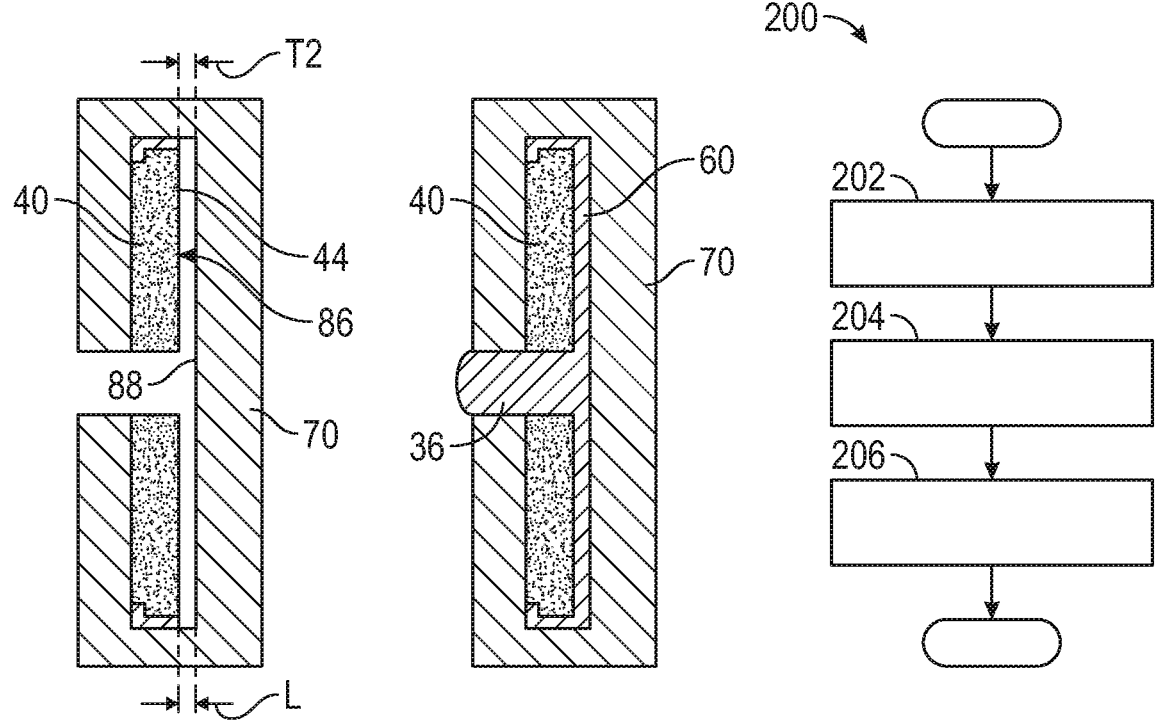
FIG. 5B
FIG. 5C
FIG. 6

DISPLAY SCREEN WITH INTEGRATED POST

INTRODUCTION

The present disclosure relates to a display screen. More particularly, the present disclosure relates to a display screen having an integrated post located along a viewing surface of a cover lens.

Many vehicles include console displays that allow passengers to control various vehicle systems. Some example of vehicle systems that may be controlled by a console display include, but are not limited to, heating, ventilation, and air conditioning (HVAC) systems, navigation systems, and audio systems. Some console displays may also include an integrated post that projects in an outward direction relative to the surface of the display. The post may be or knob, button, or other device that a passenger may manipulate to control the corresponding vehicle system. The post may be transparent in order to allow for images representing text or graphics to be seen by passengers. For example, an HVAC display may include one or more knobs that define an end face. Information such as temperature may be displayed along the surface of the end face.

It may be challenging to fabricate a display with an integrated post. For example, the methods presently available to attach a post to a viewing surface of the display may not be robust. This results in a flimsy or unreliable connection between the post and the display screen. Furthermore, the knob may not include the optical properties necessary for a passenger to clearly view the text or graphics.

Thus, while current displays achieve their intended purpose, there is a need for a new and improved system and method for providing a display having an integrated knob.

SUMMARY

According to several aspects, a display screen is disclosed. The display screen includes a display screen body having a viewing surface, a rear surface, and an aperture extending between the viewing surface and the rear surface. The display screen also includes a post constructed of a substantially transparent material without birefringence. The post is located within the aperture of the display screen body. A portion of the post extends out of the aperture in a direction away from the viewing surface of the display screen body to create a projection.

In another aspect of the disclosure, the post is bonded to the display screen body.

In yet another aspect of the disclosure, the aperture defines an inner surface, and the post is bonded to the inner surface of the aperture of the display screen body.

In still another aspect of the disclosure, the post includes an end face and a stem. The stem connects the post to a polymer body.

In another aspect of the disclosure, the polymer body includes a base having a front face and a rear face. The front face of the base is bonded to the rear surface of the display screen.

In yet another aspect of the disclosure, the display screen body is constructed of at least one of poly(methyl methacrylate) (PMMA) and polyurethane (PU).

In still another aspect of the disclosure, the display screen body is constructed of at least one of: PMMA, polycarbonate (PC), PU, and tempered glass.

In another aspect of the disclosure, the post is either a knob or a button.

In yet another aspect of the disclosure, the post defines an end face. The end face includes a curved profile.

In still another aspect of the disclosure, the display screen body and the post are part of a touchscreen.

In another aspect of the disclosure, a head unit for a vehicle is disclosure. The head unit includes a bezel, a housing removable attached to the bezel, and a display screen supported by the housing. The display screen includes a display screen body having a viewing surface, a rear surface, and an aperture extending between the viewing surface and the rear surface. The display screen also includes a post constructed of a substantially transparent material without birefringence. The post is located within the aperture of the display screen body. A portion of the post extends out of the aperture in a direction away from the viewing surface of the display screen body to create a projection.

In another aspect of the disclosure, the post is bonded to the display screen body.

In yet another aspect of the disclosure, the aperture defines an inner surface. The post is bonded to the inner surface of the aperture of the display screen body.

In still another aspect of the disclosure, the post includes an end face and a stem. The stem connects the post to a polymer body.

In another aspect of the disclosure, the polymer body includes a base having a front face and a rear face. The front face of the base is bonded to the rear surface of the display screen.

In yet another aspect of the disclosure, the display screen body is constructed of at least one of PMMA and polyurethane PU.

In another aspect of the disclosure, a method of creating a display screen is disclosed. The method includes placing a display screen body in a mold. The display screen includes a viewing surface, a rear surface, and an aperture extending between the viewing surface and the rear surface. The method also includes substantially filling the aperture with a substantially transparent material without birefringence to create a post during a molding process, where a portion of the post extends out of the aperture in a direction away from the viewing surface of the display screen body to create a projection.

In yet another aspect of the disclosure, the method further comprises creating a cavity between the rear surface of the display screen and a wall of the mold, and substantially filling the cavity with the substantially transparent material without birefringence during the molding process.

In still another aspect of the disclosure, the method further comprises bonding the post to the display screen body during the molding process.

In another aspect of the disclosure, the method further comprises selecting the substantially transparent material without birefringence to be at least one of PMMA and PU.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is an enlarged view of an end face of a post that is shown in FIG. 2 according to an exemplary embodiment;

FIGS. 5A-5C illustrate a molding process for creating the display screen shown in FIG. 2 according to an exemplary embodiment; and FIG. 6 is a process flow diagram illustrating an exemplary method for creating the display screen according to an exemplary embodiment.

DETAILED DESCRIPTION

The following description is merely exemplary in nature and is not intended to limit the present disclosure, application, or uses.

Figure 1:
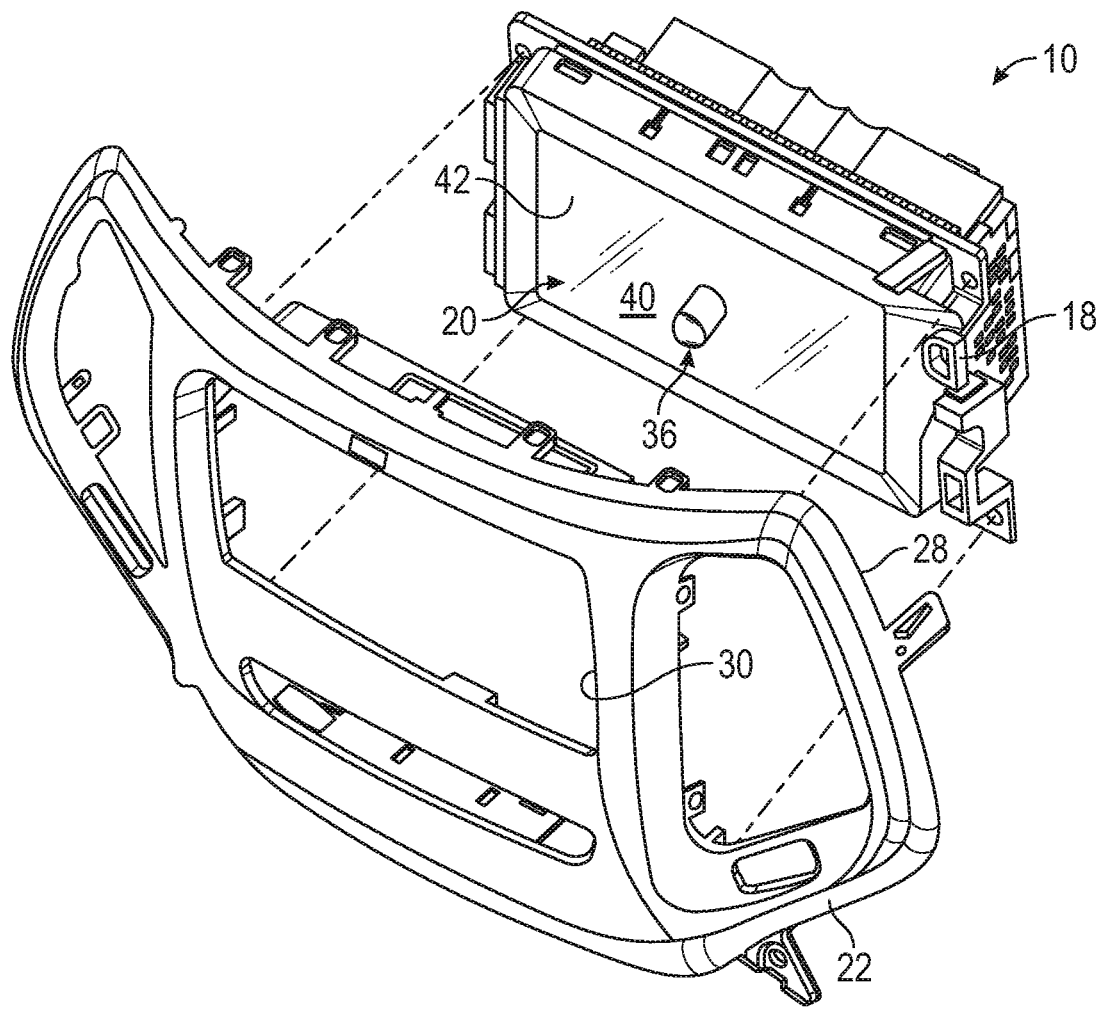
FIG. 1 is an exploded view of a display unit including a display screen with an integrated post according to an exemplary embodiment.

Referring to FIG. 1, an exploded view of a display unit 10 is shown. The display unit 10 includes a housing 18, a display screen 20, and a bezel 22. The display screen 20 is supported by the housing 18 and is electrically connected to a circuit board (not visible) that is located within the housing 18. The housing 18 is removably attached to a rear surface 28 of the bezel 22. The bezel 22 defines an opening 30 that is shaped to correspond with the display screen 20. Therefore, when the housing 18 is removably attached to the bezel 22 the display screen 20 is visible through the opening 30 in the bezel 22. In one non-limiting embodiment, the display unit 10 is a head unit for a vehicle. Specifically, the head unit may be part of an infotainment system or a heating, ventilation, and air conditioning (HVAC) system. In an embodiment, the vehicle may be an automobile such as, for example, a sedan, sport utility vehicle, or a van. However, the vehicle is not limited to automobiles, and may include marine or avionics applications as well. For example, the display unit 10 may be used in a boats or aircraft cockpit as well. Furthermore, it is to be appreciated that the display unit 10 is not limited to vehicles and may be used in any application where a display screen is included.

The display screen 20 is a touchscreen that is configured to accept as input touch commands from an individual, and displays graphics such as, for example, text, images, and moving pictures. If the display screen 20 is a head unit located in a vehicle, then the display screen 20 is located in an area that may be viewed by a driver such as, for example, in the center console located within an interior of the vehicle. The display screen 20 may be a liquid crystal display (LCD) or a light emitting diode (LED) panel, however the disclosure is not limited to these types of displays. The display screen 20 includes one or more integrated posts 36. In the exemplary embodiment as shown in the figures, the display screen 20 only includes one post 36, however it is to be appreciated that the display screen 20 may include any number of posts 36. In an embodiment, the post 36 also includes touch activated control similar to the display screen 20. Specifically, a user may touch the post 36 using his or her hands to create an input.

Figure 2:
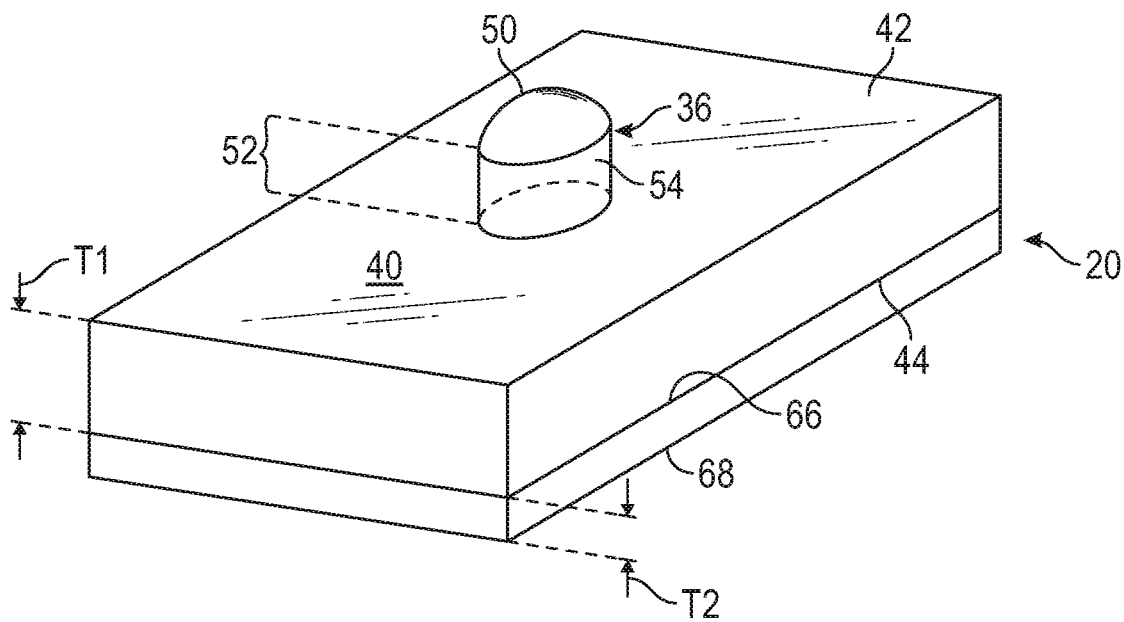
FIG. 2 is a perspective view of the display screen shown in FIG. 1 according to an exemplary embodiment.

FIG. 2 is a perspective view of the display screen 20 shown in FIG. 1. The display screen 20 includes a display screen body 40. The display screen body 40 may also be referred to as a cover lens, and is constructed of one or more transparent materials such as, but not limited to, poly(methyl methacrylate) (PMMA), polycarbonate (PC), polyurethane (PU), or tempered glass. Referring to both FIGS. 1 and 2, the display screen body 40 includes a front viewing surface 42 and a rear surface 44. The front viewing surface 42 is visible when the display unit 10 is installed within a vehicle. In other words, an individual would face the front viewing surface 42 when watching the display screen 20. The post 36 is disposed along the front viewing surface 42 of the display screen body 40. In one non-limiting embodiment, the post 36 is a knob or a button that a user may manipulate based on touchscreen technology.

Figure 3:
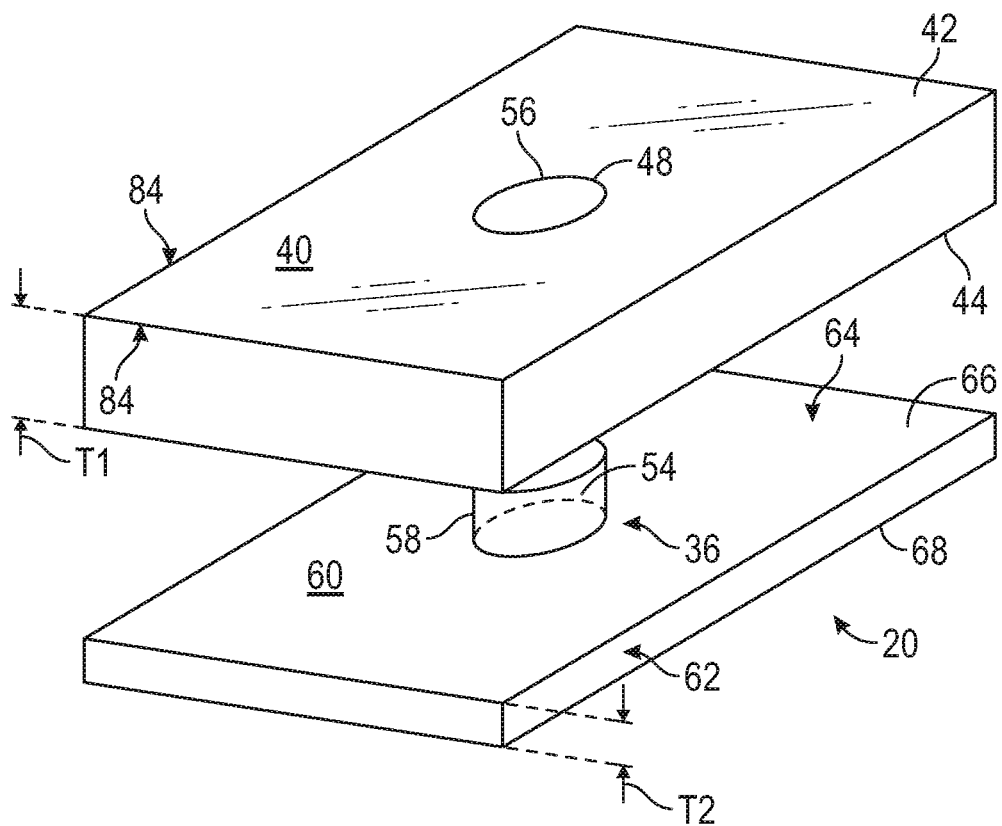
FIG. 3 is an exploded view of the display screen shown in FIG. 2 according to an exemplary embodiment.

FIG. 3 is an exploded view of the display screen 20, where the display screen body 40 is shown separately from the post 36. The display screen body 40 defines a through hole or aperture 48 that extends between the front viewing surface 42 and the rear surface 44. The aperture 48 is sized and shaped to receive the post 36. The post 36 is part of a polymer body 60. It is to be appreciated that while FIG. 3 illustrates the display screen body 40 and the polymer body 60 separately, the polymer body 60 is bonded to the display screen body 40. The polymer body 60 is bonded to the display screen body 40 during a molding process that is described below.

Referring to both FIGS. 2 and 3, the polymer body 60, which includes the post 36, is constructed of a substantially transparent material without birefringence. Some examples of substantially transparent materials without birefringence that are used for the polymer body 60 include, but are not limited to, PMMA and PU. It is to be appreciated that materials with birefringence may not be used for the polymer body 60 because of a property or characteristic referred to as the rainbow effect. Specifically, if the post 36 is constructed of a birefringent material, then color distortions or fringes may be visible to a viewer as polarized light passes through the post 36. The color distortions are referred to as the rainbow effect. However, color distortions or fringes are not visible when the post 36 is constructed of a material that does not exhibit birefringence.

As seen in FIGS. 2 and 3, the display screen body 40 includes a first thickness T1 and the polymer body 60 includes a second thickness T2. If the display screen 20 is used in a vehicle application, in one non-limiting embodiment the first thickness T1 of the display screen body 40 ranges from about 0.7 to about 1.1 millimeters. However, it is to be appreciated that the display screen body 40 is not limited to these dimensions. The second thickness T2 of the polymer body 60 is controlled. That is, the second thickness T2 of the polymer body 60 includes a maximum dimension. The maximum dimension is based on the materials that the display screen body 40 and the polymer body 60 are constructed of. The second thickness T2 of the polymer body 60 is controlled to substantially eliminate any birefringence that may occur as light passes through both the display screen body 40 and the polymer body 60.

Referring specifically to FIG. 2, a portion 52 of the post 36 extends out of the aperture 48 in a direction away from the front viewing surface 42 of the display screen body 40 to create a projection. The post 36 includes an end face 50 and a stem 54. It is to be appreciated that text, graphics, or images are visible along the end face 50 of the post 36. Furthermore, because the post 36 includes non-birefringence resin, a user does not generally observe color aberrations along the end face 50 of the post 36. Referring to both FIGS. 2 and 3, the stem 54 connects the post 36 to a sheet portion or base 64 of the polymer body 60. The base 64 includes a flattened profile, and acts as a support or anchor for the post 36. The base 64 of the polymer body 60 includes a front face 66 and a rear face 68.

As seen in FIG. 3, the aperture 48 defines an inner surface 56. During a molding process as described below and illustrated in FIGS. 5A, 5B, and 5C, the post 36 is bonded using resin infusion to the display screen body 40. More specifically, the stem 54 of the post 36 is bonded to the inner surface 56 of the aperture 48 of the display screen body 40. Moreover, the base 64 of the polymer body 60 is bonded to the display screen body 40 as well. Specifically, the front face 66 of the base 64 is bonded to the rear surface 44 of the display screen body 40. In the non-limiting embodiment as shown in FIGS. 2 and 3, the post 36 includes a substantially cylindrical profile and the aperture 48 includes a substantially round profile. However, it is to be appreciated that the embodiments shown in the figures are merely exemplary in nature. Indeed, the aperture 48 and the post 36 may include any number of shapes and configurations. For example, in another embodiment the post 36 may be shaped as a substantially rectangular prism, and the aperture 48 includes a corresponding profile.

An enlarged view of the end face 50 of the post 36 is shown in FIG. 4. In the embodiment as shown in FIG. 4, the end face 50 of the post 36 includes a curved profile. The specific curvature of the curved profile determines a viewing angle α of the end face 50 of the post 36. The viewing angle α is measured with respect to a central axis A-A of the post 36. The viewing angle α represents a maximum angle from the central axis A-A of the post 36 at which a user 78 is still able to view the end face 50 of the post 36. The curved profile of the end face 50 of the post 36 also acts as a convex lens to enlarge text or graphics that are viewed along the end face 50. It is to be appreciated that in some embodiments the end face 50 of the post 36 is substantially flat. However, a flat end face 50 constricts or reduces the viewing angle α. Furthermore, a flat end face 50 also does not enlarge or magnify any text or graphics that may be viewed along the end face 50. Accordingly, the end face 50 may be shaped flat or curved. However, a curved profile provides optical effects such as magnification or a widened viewing angle.

Fabrication of the disclosed display screen 20 is now described with reference to FIGS. 5A, 5B, and 5C. FIG. 5A is a cross-sectioned view of the display screen body 40 without the polymer body 60 (i.e., before the molding process that creates the polymer body 60 is performed). FIG. 5B is a cross-sectioned view of the display screen body 40 shown in FIG. 5A being placed within a mold 70. FIG. 5C is an illustration of the display screen 20 after the molding process. The polymer body 60, and thereby the post 36, is created during the molding process. In an embodiment, the molding process is based on injection molding, however it is to be appreciated that the disclosed process is not limited to injection molding.

Before the post 36 is created by the molding process, the display screen body 40 seen in FIG. 5A is first placed into the mold 70. As seen in FIG. 5A, a polymer lining 74 covers an outermost periphery 80 of the display screen body 40. The polymer lining 74 may also cover a portion of the front viewing surface 42 of the display screen body 40. Specifically, the polymer lining 74 may cover the edges 84 (seen in FIG. 3) of the front viewing surface 42 of the display screen body 40. The polymer lining 74 is constructed of the same material as post 36 or, alternatively, of a material that fuses or bonds together with the material that the post 36 is constructed of during the molding process.

Referring specifically to FIG. 5B, when the display screen body 40 is placed within the mold 70, a volume of empty space or cavity 86 is created between an inner wall 88 of the mold 70 and the rear surface 44 of the display screen body 40. Referring to both FIGS. 3 and 5B, the cavity 86 within the mold 70 is shaped to correspond with the base 64 of the polymer body 60. Specifically, a length L of the cavity 86 is measured between the between the inner wall 88 of the mold 70 and the rear surface 44 of the display screen body 40. The length L of the cavity 86 is about equal to the second thickness T2 of the polymer body 60. Furthermore, the aperture 48 of the display screen body 40 is empty. That is, there is no post 36 that is presently filling the aperture 48.

FIG. 5C illustrates the mold 70 shown in FIG. 5B after the aperture 48 of the display screen body 40 and the cavity 86 are both filled during the molding process. Specifically, the molding process fills the cavity 86 in the mold 70 as well as the aperture 48 of the display screen body 40 with substantially transparent material without birefringence (i.e., the material of the polymer body 60). During the molding process, the polymer body 60 is bonded or infused to the display screen body 40.

FIG. 6 is an exemplary process flow diagram illustrating a method 200 for creating the display screen 20 with the integrated post 36 (FIG. 2). Referring now to FIGS. 5A and 6, the method 200 begins at block 202. In block 202, the display screen body 40 is placed within the mold 70. The method 200 may then proceed to block 204.

In block 204, the molding process is performed. Referring to FIGS. 2, 3, 5B, 5C, and 6, during the molding process the aperture 48 of the display screen body 40 is filled with a substantially transparent material without birefringence to create the post 36. The cavity 86 created between the inner wall 88 of the mold 70 and the rear surface 44 of the display screen body 40 is also filled with the substantially transparent material without birefringence. As mentioned above, the post 36 is bonded to the inner surface 56 of the aperture 48 of the display screen body 40, and the base 64 of the polymer body 60 is bonded to the display screen body 40. The method may then proceed to block 206.

In block 206, the display screen 20 is then cooled and removed from the mold 70. The method 200 may then terminate.

Referring generally to the figures, the present disclosure provides a robust, cost-effective display screen having an integrated knob. The knob is resin bonded to the cover lens of the display screen during a molding process. This results in a robust, solid connection between the cover lens and the knob of the display screen. In contrast, previous attempts to integrate a knob with the display screen have resulted in a flimsy or unreliable connection between the two components. Furthermore, images such as text and graphics may also be viewed along the end face of the disclosed knob as well.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A display screen, comprising:
a display screen body having a viewing surface, a rear surface, and an aperture extending between the viewing surface and the rear surface; and
a post constructed of a substantially transparent material without birefringence, the post having a polymer body and a stem extending from the polymer body, the polymer body disposed on the rear surface of the display screen body, the stem extending from the polymer body and located within the aperture of the display screen body, wherein a portion of the post extends out of the aperture and through the viewing surface in a direction away from the viewing surface of the display screen body to create a projection,
wherein the post is bonded to the display screen body,
wherein the aperture defines an inner surface, and the post is bonded to the inner surface of the aperture of the display screen body.

2. The display screen of claim 1, wherein the post includes an end face and a stem, and wherein the stem connects the post to a polymer body.

3. The display screen of claim 2, wherein the polymer body includes a base having a front face and a rear face, and wherein the front face of the base is bonded to the rear surface of the display screen.

4. The display screen of claim 1, wherein the display screen body is constructed of at least one of poly(methyl methacrylate) (PMMA) and polyurethane (PU).

5. The display screen of claim 1, wherein the display screen body is constructed of at least one of: PMMA, polycarbonate (PC), PU, and tempered glass.

6. The display screen of claim 1, wherein the post is either a knob or a button.

7. The display screen of claim 1, wherein the post defines an end face, and wherein the end face includes a curved profile.

8. The display screen of claim 1, wherein the display screen body and the post are part of a touchscreen.

9. A head unit for a vehicle, the head unit comprising:
a bezel;
a housing removable attached to the bezel; and
a display screen supported by the housing, the display screen comprising:
a display screen body having a viewing surface, a rear surface, and an aperture extending between the viewing surface and the rear surface; and
a post constructed of a substantially transparent material without birefringence, the post having a polymer body and a stem extending from the polymer body, the polymer body disposed on the rear surface of the display screen body, the stem extending from the polymer body and located within the aperture of the display screen body, wherein a portion of the post extends out of the aperture and through the viewing surface in a direction away from the viewing surface of the display screen body to create a projection,
wherein the post is bonded to the display screen body,
wherein the aperture defines an inner surface, and the post is bonded to the inner surface of the aperture of the display screen body.

10. The head unit of claim 9, wherein the post includes an end face and a stem, and wherein the stem connects the post to a polymer body.

11. The head unit of claim 10, wherein the polymer body includes a base having a front face and a rear face, and wherein the front face of the base is bonded to the rear surface of the display screen.

12. The display screen of claim 9, wherein the display screen body is constructed of at least one of poly(methyl methacrylate) (PMMA) and polyurethane (PU).

* * * * *